United States Patent [19]

Takano

[11] 3,777,796
[45] Dec. 11, 1973

[54] SCREW ROD WITH WASHER
[75] Inventor: Tetsuo Takano, Toyama, Japan
[73] Assignee: Takano Seimitsu Kogyo Co., Ltd., Nei-gun, Toyama-ken, Japan
[22] Filed: Nov. 18, 1971
[21] Appl. No.: 199,923

[30] Foreign Application Priority Data
Nov. 19, 1970 Japan.............................. 45/102323
Nov. 19, 1970 Japan.............................. 45/114967
Mar. 16, 1971 Japan.............................. 46/17563
Sept. 27, 1971 Japan.............................. 46/75315

[52] U.S. Cl..................... 151/38, 85/1 R, 85/50 R, 339/246
[51] Int. Cl........................................... F16b 39/24
[58] Field of Search.................. 85/50, 1 R; 151/38; 339/263 R, 269, 246

[56] References Cited
UNITED STATES PATENTS
3,181,584 5/1965 Borowsky .............. 151/38
2,254,288 9/1941 Holleran ................ 151/38
1,547,162 7/1925 Bohlman ................ 85/50 R FOREIGN PATENTS OR APPLICATIONS
1,198,187 7/1970 Great Britain ................. 339/263 R
381,199 1/1931 France ................................. 151/38

Primary Examiner—Edward C. Allen
Attorney—James E. Armstrong et al.

[57] ABSTRACT

In a screw rod-washer assembly comprising a screw rod and a plain wahser fitted around the neck of said screw rod, the plain washer is secured to the neck of the screw rod by means of a plurality of projections formed at the inner peripheral edge of said plain washer and projecting close to the outer peripheral surface of said screw rod and, when said assembly further comprises a spring washer, said spring washer and said plain washer are integrally secured to each other by means of an upward annular projection projecting from the inner peripheral edge of the latter and received in the central hole of the former with the upper edge portion thereof bent radially outwardly in a manner to embrace the edge of the central hole of said spring washer, so that the screw rod-washer assemblies of the invention are adapted for mass production.

2 Claims, 6 Drawing Figures

SCREW ROD WITH WASHER

This invention generally relates to screw rod-washer assemblies used as fasteners and more specifically to screw rod-washer assemblies adapted for use, for example, in the tightening of the terminal ends of lead wires to electric equipments or parts.

The connection of the terminal ends of lead wires to electric equipments or parts has been effected in some cases by soldering but in most cases by means of screws. This is because the use of screws facilitates the connection and disconnection of the lead wires and hence is convenient in the assembly and repair of the electric equipments. In connecting the terminal end of a lead wire by means of a screw, a washer is used in combination with the screw, and in addition, a spring washer is frequently used where there is a fear of the screw becoming loosened under vibration or other influences. Therefore, on such occasions it becomes necessary to use the screw, the plain washer and the spring washer in the form of an assembly. The connection of the terminal end of a lead wire involves the steps of removing or loosening the screw, lifting the washer, inserting the terminal end of the lead wire and tightening the screw. Therefore, when the terminal ends, e.g., terminal blocks or terminal lips, of a large number of lead wires are to be connected, much time and labor are required for the connecting operation and in addition, two or three parts must always be provided as a set of assembly. The loss of any one of these component parts renders the assembly useless, whereas a surplus part or parts is or are wasted. Further, it is possible that, during repair work, the washer is lost or the parts are assembled in a wrong sequence with the result that an abnormally large amount of heat is generated at the connection.

In order to obviate the above disadvantages, it has become necessary to use screw rod-washer assemblies for the tightening of terminals, and in the production of such screw rod-washer assemblies there has been employed a method which comprises mounting a plain washer or a plain washer and a spring washer around a screw rod blank before rolling, and carrying out rolling of the screw rod blank to form a screw rod having a full diameter larger than the diameter of the blank, whereby said washer is assemblied with said screw rod in such a manner that it is not allowed to move off the latter. However, since the rolling is carried out after the washer is mounted on the screw rod blank, this prior art method has been low in productivity and hence not adapted for mass production. In addition, the production cost of the screw rod-washer assemblies has been high.

The screw rod-washer assemblies according to the present invention overcome the defects of those produced by the above-described prior art method, and are produced by a method in which a screw rod, a plain washer punched out of a web of blank material and, if necessary, a spring washer punched out of a web of blank material such as a bainite steel band, are concurrently fed into a die in a predetermined sequence, whereby a screw rod-washer assembly composed of the two or three parts is completed in one step. In the case of producing a screw rod-washer assembly composed of the aforesaid three parts by this method, the method essentially comprises the steps of forming on the plain washer an annular porjection as means for coupling the spring washer therewith, fitting the spring washer around said projection caulking the projection radially outwardly, inserting the screw rod into the central hole of the plain washer and then caulking the inner peripheral end of the plain washer at a plurality of locations to form a plurality of projections to prevent the screw rod from moving off the plain washer.

This method will be described in further detail hereunder: The plain washer and the spring washer are produced one after another in a common continuous shaping die. Namely, a blank material web of the plain washer is fed into the shaping die in which it is subjected to central hole coining and punching operations and an outer profile shaping operation to form the plain washer. A blank material web of the spring washer is fed into the same shaping die in a direction at right angles to the feeding direction of the plain washer blank material web and therein subjected to a central hole punching and shaping operation. Thereafter, it is laid above the plain washer blank material web in crossing relation thereto and subjected to an outer profile punching operation, whereby the spring washer is formed and at the same time the annular projection of the plain washer is received in the central hole of said spring washer and caulked in the way described previously. After the plain washer and the spring washer have been coupled with each other in the manner described, the screw rod delivered one by one by screw rod feeder is inserted into the central holes of said washers and then a plurality of projections are formed on the lower surface of the plain washer, which project toward the neck of the screw rod to hold said screw rod against removal from the central hole of the plain washer. The screw rod-washer assemblies thus produced are removed one by one from the continuous webs in the next step.

As described above, the component parts of the screw rod-washer assemblies of the invention, i.e., the screw rod, the plain washer and the spring washer, each has a shape and a structure which enable the parts to be continuously easily fabricated and assembled together. Therefore, the supply of completed washers in the production of the assemblies is unnecessary as has been necessary in the production of the conventional ones. Namely, the screw rod-washer assemblies of the invention are assembled and completed while the washer or washers is or are being fabricated from the blank material web or webs processed through one step to another, and therefore, the completed assembly can be obtained at the same speed as the speed of fabricating the washer only. In the production of the screw rod-washer assemblies, the step of fabricating the washer or washers, the step of assembling the washer or washers with the screw rod and the step of securing the members to each other are completed all at once, so that the production rate can be increased to several times that of the conventional ones and the mass production is facilitated and further the production cost can be substantially reduced.

As may be understood from the foregoing, an object of the present invention is to provide a screw rod-washer assembly the component parts of each have such a shape and a structure that they can be continuously fabricated and assembled and thereby the assembly can be produced at a substantially higher rate than conventional ones.

Another object of the invention is to provide a screw rod-washer assembly in which the washer will never be allowed to mesh with the threaded portion of the screw rod during transportation of the assembly as well as mounting of the washer on the screw rod.

According to the present invention there is provided a screw rod with washer, consisting of a screw rod and a washer, said screw rod having a threaded portion on one side up to its end on said side and a head at the other end which is slotted for receiving a screw driver and further having an unthreaded neck portion between said head and said threaded portion having a diameter substantially equal to the effective diameter of said threaded portion, said washer being a plate-like member having a surface wider than the lower surface of said head and having formed in the center thereof a punched hole of a diameter larger than the outer diameter of the threads of said threaded portion, and further said washer being rotatably mounted around said neck portion and having a plurality of projections spaced apart from each other and formed at the inner peripheral edge of said washer which projections project radially inwardly close to the peripheral surface of said neck portion to prevent said washer from moving off said neck portion.

Embodiments of the present invention will be described hereunder with reference to the accompanying drawings in which similar parts are indicated by same numerals.

Figure 1:
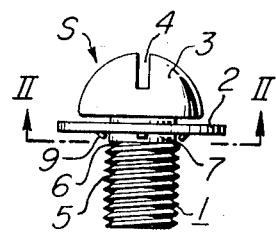
FIG. 1 is a front elevational view showing an embodiment of the screw rod with washer according to the present invention.
Figure 2:
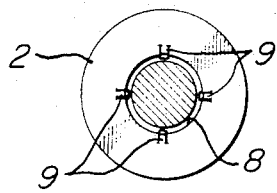
FIG. 2 is a sectional view looking in the direction of the arrows II—II of FIG. 1.

Referring to FIGS. 1 and 2, the screw rod with washer, generally indicated by character S, consists of a screw rod 1 and a plain washer 2. At the top end of the screw rod 1 is formed a slotted head 3 which, for example, has a groove 4 formed therein for engagement with a screw driver, and at the lower portion of the same is formed a threaded portion 5 having screw threads cut from the lower end of the rod at a suitable lead angle. Between the incomplete thread 6 of the threaded portion 5 and the head 3 is formed an unthreaded neck portion 7 of a diameter substantially equal to the effective diameter of the threads 5. The threads at the threaded portion 5 may be of any shape in cross section, e.g., of a triangular shape or trapezoidal shape, and are formed as by a rolling die. In the embodiment shown in FIG. 1, the incomplete thread 6 of the threaded portion gradually disappears like that of the ordinary rolled threads. The plain washer 2 may be of a suitable shape such as a circular shape or square shape and is a plate having an upper surface wider than the lower surface of the head 3 and being formed centrally thereof with a punched hole 8 of a diameter slightly larger than the outer diameter of the threads of the screw rod 1. The plain washer 2 is mounted around the neck portion 7 of the screw rod 1 by having the screw rod inserted from its lower end into said plain washer. Further, the plain washer 2 has projections 9 formed on the lower surface thereof at a plurality of locations (four locations in the embodiment shown in FIG. 2) along the edge of the central hole 8 thereof by means of a punch or the like tool, which project radially inwardly close the the peripheral surface of the neck portion 7 and by which the plain washer 2 is prevented from moving off the screw rod 1.

Figure 3:
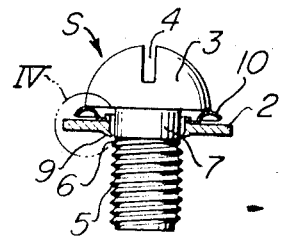
FIG. 3 is a front elevational view partially in section showing another embodiment of the screw rod with washer of the invention comprising a spring washer.
Figure 4:
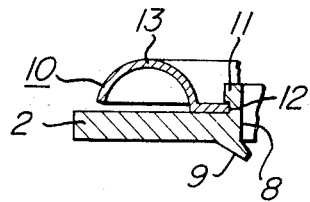
FIG. 4 is a vertical sectional view showing in an enlarged scale the essential portion of the screw rod with washer shown in FIG. 3.

In another embodiment of the invention shown in FIGS. 3 and 4, a spring washer 10 is mounted around the neck portion 7 of the screw rod 1 between the plain washer 2 and the head 3, so as to prevent the screw rod from becoming loosened under vibration or other influences. An annular projection 11 is formed on the plain washer 2 projecting upwardly along the peripheral edge of the central hole 8 thereof, while a punched hole 12 of a diameter larger than the central hole 8 of the plain washer is formed centrally in the spring washer 10. The outer peripheral portion of the spring washer 10 is curved to form a raised portion 13. The annular projection 11 of the plain washer 2 is received in the central hole 12 of the spring washer 10 and the upper end thereof is bent radially outwardly by caulking it, whereby the spring washer 10 is integrally secured to the plain washer 2.

Figure 5:
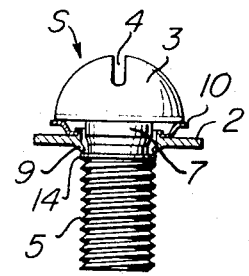
FIG. 5 is a vertical sectional view showing a still another embodiment of the screw rod with washer of the invention, in which a flange is formed between the neck portion and the threaded portion of the screw rod.
Figure 6:
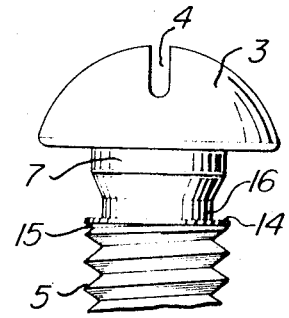
FIG. 6 is a front elevational view showing in an enlarged scale the essential portion of the screw rod with washer shown in FIG. 5.

Still another embodiment of the screw rod with washer of the invention, shown in FIGS. 5 and 6, is of the type consisting of a screw rod, a plain washer and a spring washer, but in this embodiment the screw rod 1 is provided between the neck portion 7 and the threaded portion 5 with a flange 14 extending perpendicularly to the axis thereof and having a diameter substantially equal to the outer diameter of the threaded portion 5. The lead angle of the thread 15 adjoining the flange 14 is about one-half of that of the other threads, and the helices of the crest and root of said thread 15 respectively lead to the lower surface of the flange 14. Further, the portion 16 of the neck portion 7 adjoining the flange 14 is made smaller in diameter than the other portion of the same to facilitate the formation of the flange 14. The flange 14 serves to prevent the plain washer 2 from meshing with the threads 5 during the washer mounting operation and trasportation of the screw rod with washer.

What is claimed is:

1. A screw rod with washer, consisting of a screw rod and a washer, said screw rod having a threaded portion on one side up to its end on said side and a head at the other end which is slotted for receiving a screw driver and further having an unthreaded neck portion between said head and said threaded portion, said neck portion having a diameter substantially equal to the effective diameter of said threaded portion, said washer being a plate-like member without substantial curvature in vertical cross-section and having a surface wider than the lower surface of said head and having formed in the center thereof a punched hole of a diameter larger than the outer diameter of the threads of said threaded portion, and further said washer being rotatably mounted around said neck portion and having a plurality of projections spaced apart from each other and formed at the inner peripheral edge of said washer which projections project radially inwardly close to the peripheral surface of said neck portion to prevent said washer from moving off said neck portion, and wherein a sprng washer having a curved configuration in transverse cross-section is mounted around the neck portions of said screw rod between said plain washer and said head and secured to said plain washer, and a flange portion formed between the neck portion and the threaded portion of said screw rod and which extends perpendicularly to the axis of said screw rod and has a diameter substantially equal to the outer diameter of the threads of said threaded portion, and further the lead angle of the thread of the threaded portion adjoining said flange is reduced to about one/half of that of the other threads so that the helices of the crest and root of said thread may lead to the lower surface of said flange, respectively, and wherein said plain washer is formed with an annular projection extending upwardly from the inner peripheral edge thereof, while said spring washer is formed centrally therein with a punched hole of a diameter larger than the diameter of the central hole of said plain washer, and said annular projection is received in the central hole of said spring washer and the upper end thereof is bent radially outwardly by caulking it, whereby said plain washer and said spring washer are integrally secured to each other.

2. A screw rod with washer according to claim 1, wherein the part of said neck portion adjoining said flange is reduced in diameter relative to the other portion of the same, such as to facilitate the formation of the flange to enable said flange to prevent the plain washer from contacting the threads.

* * * * *